United States Patent
Burke et al.

(10) Patent No.: US 8,910,449 B2
(45) Date of Patent: *Dec. 16, 2014

(54) WASHER ASSEMBLY AND ARCUATE THREADED FASTENER

(75) Inventors: John Thomas Burke, Medowie (AU); Allan Walsh, Medowie (AU)

(73) Assignee: RPBSP Pty Ltd., Thornton New South Wales (AU)

( * ) Notice: Subject to any disclaimer, the term of this patent is extended or adjusted under 35 U.S.C. 154(b) by 155 days.

This patent is subject to a terminal disclaimer.

(21) Appl. No.: 13/509,887

(22) PCT Filed: Nov. 4, 2010

(86) PCT No.: PCT/AU2010/001469
§ 371 (c)(1),
(2), (4) Date: May 15, 2012

(87) PCT Pub. No.: WO2011/063445
PCT Pub. Date: Jun. 3, 2011

(65) Prior Publication Data
US 2012/0222381 A1  Sep. 6, 2012

(30) Foreign Application Priority Data

Nov. 25, 2009  (AU) ................. 2009905772

(51) Int. Cl.
*E04B 1/38* (2006.01)
*E04C 5/00* (2006.01)
*F16B 43/02* (2006.01)
*E04B 1/41* (2006.01)

(52) U.S. Cl.
CPC ............... *E04B 1/4121* (2013.01); *F16B 43/02* (2013.01)

USPC .............. 52/707; 52/125.5; 52/699; 411/539; 411/533; 411/368

(58) Field of Classification Search
USPC ............. 52/699, 707, 701, 704, 125.1, 125.2, 52/125.5; 411/539, 538, 531, 533, 534, 411/545, 368, 372, 330, 313
See application file for complete search history.

(56) References Cited

U.S. PATENT DOCUMENTS

| | | | |
|---|---|---|---|
| 629,699 A | | 7/1899 | McQueen |
| 2,685,469 A | | 8/1954 | Butler et al. |
| 3,135,309 A | * | 6/1964 | Soltysik ................. 411/176 |
| 3,451,455 A | * | 6/1969 | Parkin .................. 411/108 |
| 4,293,259 A | * | 10/1981 | Liebig ................... 411/32 |
| 5,090,855 A | * | 2/1992 | Terry .................... 411/144 |
| 5,352,078 A | * | 10/1994 | Nasu .................... 411/337 |

(Continued)

FOREIGN PATENT DOCUMENTS

| | | |
|---|---|---|
| FR | 2744501 A | 8/1997 |
| FR | 2768204 A1 | 3/1999 |
| WO | 2008115083 A1 | 9/2008 |
| WO | 2008123893 A1 | 10/2008 |

*Primary Examiner* — Chi Q Nguyen
(74) *Attorney, Agent, or Firm* — Jansson Munger McKinley & Shape Ltd.

(57) ABSTRACT

A ferrule (10) that is intended to be cast into a concrete element, such as a concrete panel. Engaged with the ferrule (10) is a washer assembly (22) that secures a plate (19) to the concrete element (16) for the purposes of securing the concrete element (16) to an adjacent concrete element (17). The washer assembly (22) has a threaded fastener (21) that can be adjusted angularly for engagement with the ferrule (10).

22 Claims, 7 Drawing Sheets

(56) References Cited

U.S. PATENT DOCUMENTS

| | | | |
|---|---|---|---|
| 5,673,888 A * | 10/1997 | Garguilo | 248/228.3 |
| 6,065,263 A * | 5/2000 | Taguchi | 52/583.1 |
| 6,224,288 B1 * | 5/2001 | Postma et al. | 403/30 |
| 6,327,829 B1 * | 12/2001 | Taguchi | 52/583.1 |
| 6,732,982 B1 | 5/2004 | Messinger | |
| 7,005,951 B2 * | 2/2006 | Motooka et al. | 333/235 |
| 8,070,404 B1 * | 12/2011 | Schluter | 411/368 |
| 8,528,273 B2 * | 9/2013 | Burke et al. | 52/125.5 |
| 2008/0003079 A1 | 1/2008 | Martinson | |
| 2011/0041449 A1 * | 2/2011 | Espinosa | 52/698 |

\* cited by examiner

WASHER ASSEMBLY AND ARCUATE THREADED FASTENER

TECHNICAL FIELD

The present invention relates the washer and ferrule described in International Patent Application PCT/AU2009/000898, and more particularly to a washer assembly to accommodate varying dimensions and angular displacement in items to be secured together by means of a threaded fastener.

BACKGROUND OF THE INVENTION

In the use of pre-cast concrete elements it is not uncommon for the elements to be secured together by means of metal plates or straps. Typically the concrete elements to be secured together would each have embedded in them a ferrule. A metal plate extends between the ferrules with threaded fasteners then passing through the metal plate to engage within the ferrules to secure the case elements together.

Due to difficulties in accurately locating the ferrules and/cir the position of the elements a disadvantage of the above discussed method is the difficulty of providing an appropriate sized metal plate.

The difficulties of the above described ferrules are addressed by the washer assembly of the abovementioned International patent application. However the washer assembly of this International patent application does not address the issue of angular displacement of the longitudinal axis of the ferrule. Accordingly the washer and ferrule described in the above International application has the disadvantage of not catering well for ferrules in which there is an angular displacement from its desired longitudinal axis orientation.

OBJECT OF THE INVENTION

It is the object of the present invention to overcome or substantially overcome the above disadvantage.

SUMMARY OF THE INVENTION

There is disclosed herein in combination a washer assembly and a threaded fastener, the threaded fastener having a longitudinal axis and to engage a concrete element having an element surface to abut the washer assembly, said assembly including:

a first washer portion having an aperture through which the threaded fastener is to pass, and a first washer portion surface at least substantially surrounding said aperture; and a second washer portion, said second washer portion having an aperture through which the fastener is to pass, the second portion having a second washer portion surface at least substantially surrounding the aperture of the second portion and being positioned to abut the surface of the first portion and to be urged into contact therewith upon tensioning of the fastener; and wherein the surface of said second washer portion extends beyond the aperture of said first portion when the surfaces abut, the aperture of said first portion is dimensioned to provide for relative movement between the portions with the apertures aligned to provide for the insertion of the threaded fastener therethrough, and washer portion surfaces have cooperating projections and recesses that inhibit relative movement between the portions when the threaded fastener is tensioned urging the surface of said second portion against the surface of said first portion; and said threaded fastener includes an arcuate surface to engage said second washer portion adjacent the aperture thereof, with the longitudinal axis of said threaded fastener being angularly displaceable relative to a desired axis.

Preferably, the aperture of said first portion has a longitudinal transverse axis with said aperture of said first portion being elongated in direction of said longitudinal axis.

Preferably, said projections are ridges and said recesses are slots.

Preferably, both surfaces have ridges and slots.

Preferably, said first portion includes projections to engage an article to be engaged by the threaded fastener.

Preferably, the assembly is adapted to engage a coupling plate to secure the coupling plate to an element, said coupling plate having an aperture to receive at least part of said first washer portion, said coupling plate having a thickness, and wherein said assembly further includes a support plate located in the aperture of the coupling plate, the support plate having a thickness no greater than the thickness of the coupling plate, with said support plate having an aperture through which the threaded fastener is to pass.

Preferably, the aperture of said support plate is the same configuration as the aperture of said first washer.

Preferably, the aperture of said first washer provides a cavity in said first washer, and said support plate substantially occupies said aperture.

Preferably, the projections and recesses of said surfaces surround the apertures of the first and second washer portion.

Preferably, each surface has the projections and ridges located in two areas, the areas being located on opposite sides of the respective aperture.

Preferably, the first washer portion is generally circular in configuration.

There is further disclosed herein a first concrete element and a second concrete element, each of the elements having a surface, with the concrete surfaces being adjacent, with at least one of the concrete elements having embedded in it a ferrule having a threaded passage extending inwardly of the element from the respective surface of that element, a coupling plate to be fixed to at least said one element, with the above combination securing the coupling plate to said one element, and said threaded fastener passing through the washer assembly and engaged in the ferrule to secure the coupling plate to the respective concrete element.

Preferably, said coupling plate has an aperture through which the threaded fastener passes, with the first washer portion urged into secure engagement with the coupling plate to secure the coupling plate to the concrete element.

Preferably, the arcuate surface of the threaded fastener is convex.

Preferably, the arcuate surface of said threaded fastener is concave.

Preferably, the arcuate surface of said threaded fastener is part of a sphere.

Preferably, said second washer portion includes an engaging surface surrounding the aperture of the second portion, said engaging surface being arcuate to match and engage the arcuate surface of the threaded fastener.

Preferably, the surface of the first portion entirely surrounds the aperture of the first portion, and the surface of the second portion entirely surrounds the aperture of the second portion.

BRIEF DESCRIPTION OF THE DRAWINGS

Preferred embodiments of the present invention will now be described, by way of an example, with reference to the accompanying drawings wherein.

DETAILED DESCRIPTION OF THE PREFERRED EMBODIMENTS

In FIGS. 1 to 15, there is depicted the washer assembly and ferrule of International Application PCT/AU2009/000898.

In FIGS. 1 to 15 of the accompanying drawings there is schematically depicted a ferrule 10 that is intended to be cast into a concrete element, such as a concrete panel or floor. The ferrule 10 includes a cylindrical body 11 through which there transversely extends a pin 12 to aid in retaining the ferrule 10 in a concrete element. The body 11 has a longitudinal axis 13 and is a cylindrical configuration. The body 11 has a longitudinal passage 14 that is threaded and terminates at its end with an annular end surface 15.

Preferably, the arcuate surface of said threaded fastener extends generally transverse relative to the longitudinal axis of said threaded fastener.

Preferably, said apertures have as their longitudinal axis said desired axis.

Preferably, the combination further includes an adaptor providing said arcuate surface.

Preferably, the threaded fastener includes a head and shaft, with the adaptor integrally formed with the head or mounted on the shaft.

Figure 2:
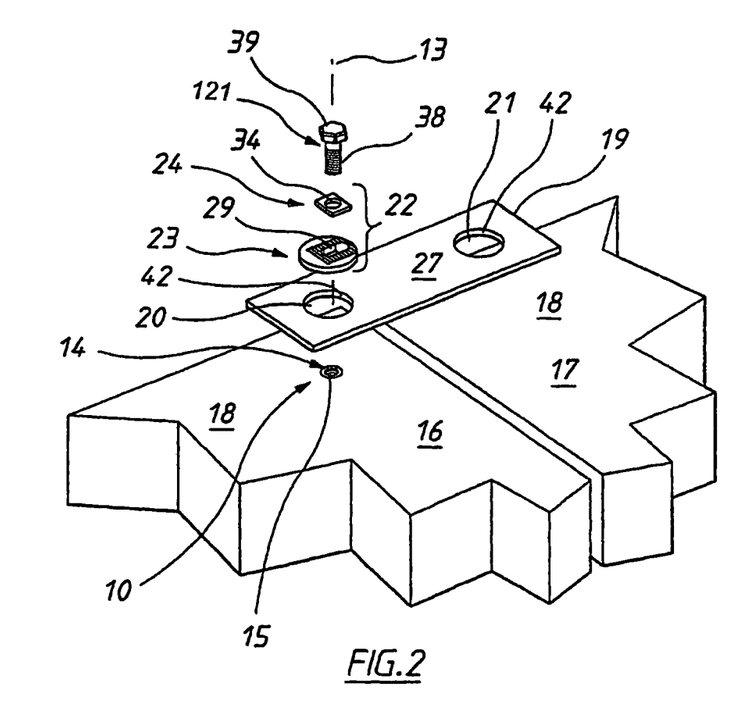
FIG. 2 is a schematic isometric parts exploded view of a pair of cast concrete elements to be secured together by a metal strap employing a ferrule, washer assembly and threaded fastener of FIG. 1.

Typically, the ferrule 10 would be embedded in a concrete element 16. The element 16 is intended to be secured to an adjacent element 17 also having a ferrule 10 (not illustrated), with the elements 16 and 17 having generally planar surfaces 18 that are co-planar. However the surfaces 18 could also be perpendicular.

To secure the elements 16 and 17 together there is provided a metal coupling plate 19 that is in the form of a strip. The plate 19 has a pair of apertures 20 and 21. When the plate 19 is abutting the surfaces 18, the apertures 20 and 21 expose the passages 14 of the adjacent ferrules 10 so that threaded fasteners 21 may pass therethrough and engage in a threaded passages 14 of the associated ferrule 10.

A washer assembly 22 is used with each threaded fastener 21 so that upon tension of the threaded fastener 21 the washer assembly 22 engages the plate 19 and retains the plate 19 fixed to the elements 16 and 17.

Figure 1:
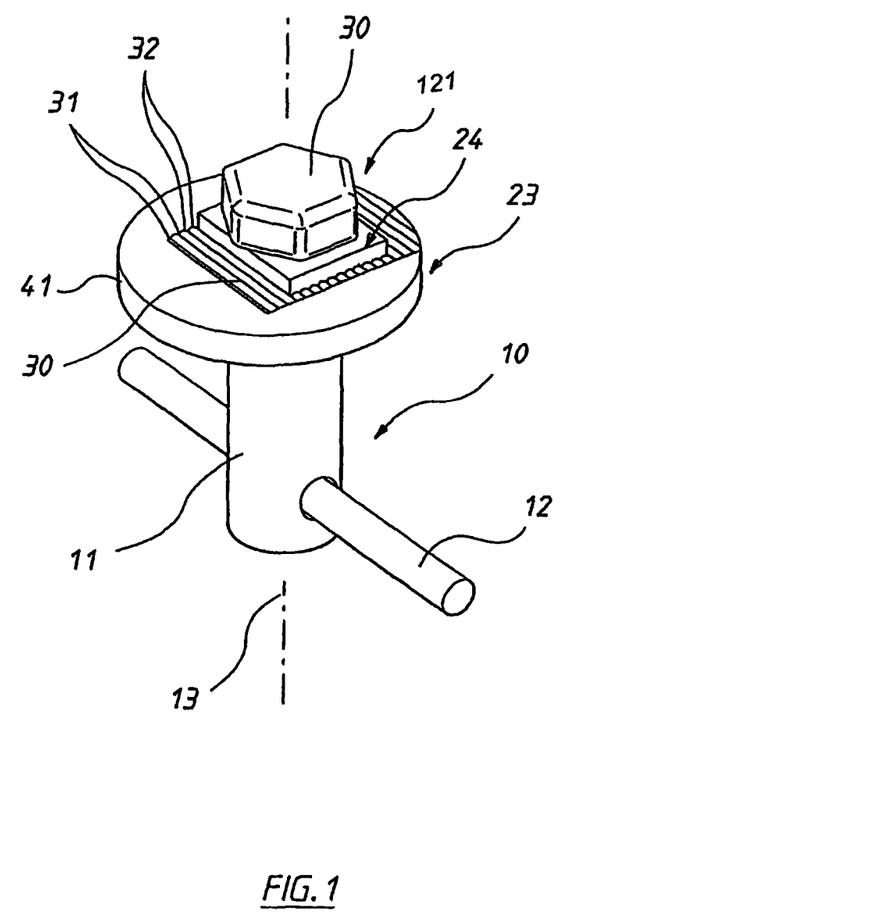
FIG. 1 is a schematic isometric view of a threaded fastener, ferrule and washer assembly.

The washer assembly 22 includes a first washer portion 23 and a second washer portion 24.

Figure 3:
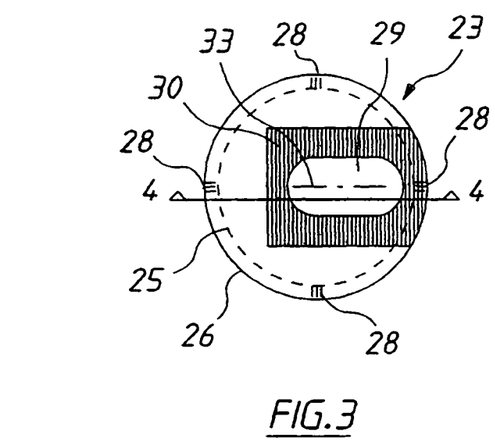
FIG. 3 is a schematic top plan view of a modification of the washer of FIG. 5.
Figure 4:
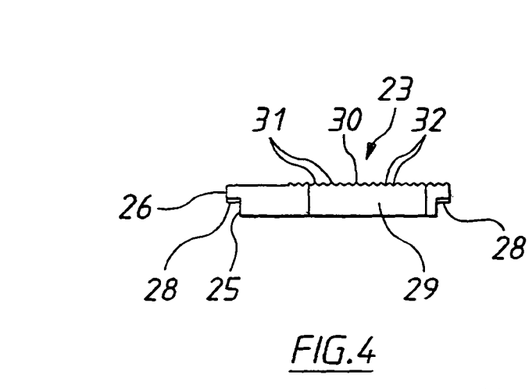
FIG. 4 is a schematic sectioned side elevation of the washer of FIG. 3 section along the lines 4-4.

In the embodiment of FIGS. 3 and 4 the washer portion 23 is of a circular configuration and includes an annular part 25 that engages within the circular aperture 20/21 and preferably is a reasonably tight fit in respect thereof. Extending laterally beyond the part 25 is an annular flange 26 that abuts the top surface 27 of the plate 19 and includes ridges 28 that engage the surface 27 and preferably plastically deform the plate 19 so that the portion 23 is firmly secured thereto. The portion 23 has an aperture 29 through which the threaded fastener 21 passes. At least substantially surrounding the aperture 29 is a surface 30. Most preferably, the surface 30 entirely surrounds the aperture 29. The surface 30 of this embodiment is provided with a plurality of projections and recesses. In this embodiment the projections and recesses are a plurality of generally parallel ridges 31 separated by generally parallel slots 32. The aperture 29 has a longitudinal axis 33 which the aperture 29 being longitudinally elongated in the direction of the axis 33.

Figures 5, 7:
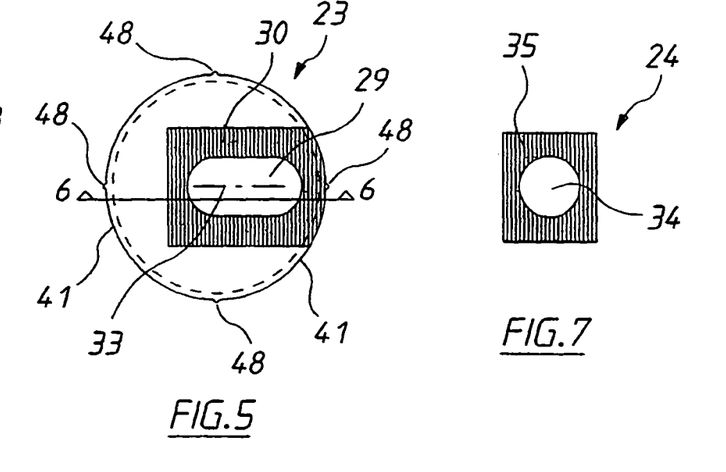
FIG. 5 is a schematic top plan view of a first washer portion employed in the washer assembly of FIG. 1.
FIG. 7 is a schematic top plan view of a second washer portion employed in the washer assembly of FIG. 1.
Figure 8:
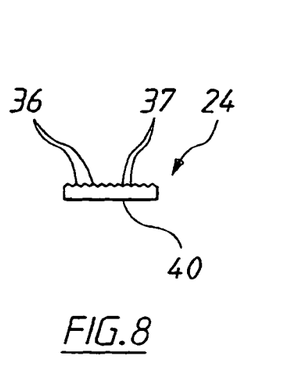
FIG. 8 is a schematic side elevation of the washer portion of FIG. 7.

The second washer portion 24 has an aperture 34 that is generally circular in configuration, with the aperture 34 being at least substantially surrounded by a surface 35.

Most preferably, the surface 35 entirely surrounds the aperture 34. The surface 35 has a plurality of projections and recesses. In this embodiment the projections and recesses of the portion 24 are generally parallel ridges 36 separated by parallel slots 37.

When assembled the plate 19 is placed on top of the surfaces 18 so that the passages 14 are exposed. Thereafter, in respect of each ferrule 10, the first washer portion 23 is inserted in the apertures 20/21 with the second washer portion 24 then being applied so that the surfaces 30 and 35 abut. Preferably they abut with the ridges 31 and 36 being generally parallel with the ridges 31 being located in the slots 37 and the ridges 36 being located in the slots 32. Thereafter the threaded fastener 21 is inserted through the aligned apertures 20/21, 34 and 29 so that the threaded shaft 38 threadingly engages within the threaded passage 14. Thereafter the head 39 of the fastener 21 is rotated to tension the fastener 21. Tensioning of the fastener 21 occurs as the head 39 abuts the upper surface 40 of the portion 24. As the threaded fastener 21 is further tensioned, the washer portion 24 is urged into contact with the washer portion 23. In particular, the surfaces 30, 35 engage so that the washer portion 24 becomes fixed to the washer portion 23, with the washer portion 23 then urging the plate 19 against the surfaces 18, thus securing the plate 19 to the elements 16 and 17.

Figure 6:
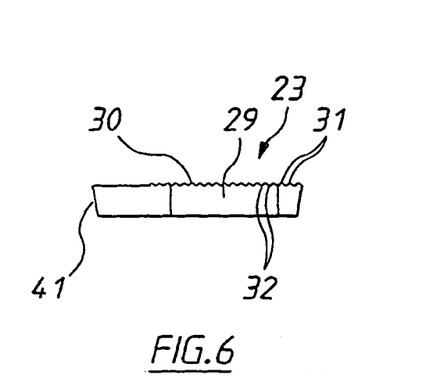
FIG. 6 is a schematic second side elevation of the washer portion of FIG. 5 section along the line 6-6.

In the embodiment of FIGS. 5 and 6, the washer portion 23 has a tapered peripheral surface 41 that engages the surface 42 of the associated aperture 20/21 so that the portion 23 becomes "wedged" in the apertures 20/21.

As the aperture 29 is elongated in the direction of the axis 33, the washer portions 23, 24 can be moved angularly about the axis 13 thereby adjusting for any inaccuracies in locating the elements 16 and 17, and/or inaccuracies in location of the ferrules 10. That is, by moving the portions 23, 24 about the axis 13 the aperture 29 is moved angularly about the axis 13 thereby providing for adjustment in respect of position.

Figure 9:
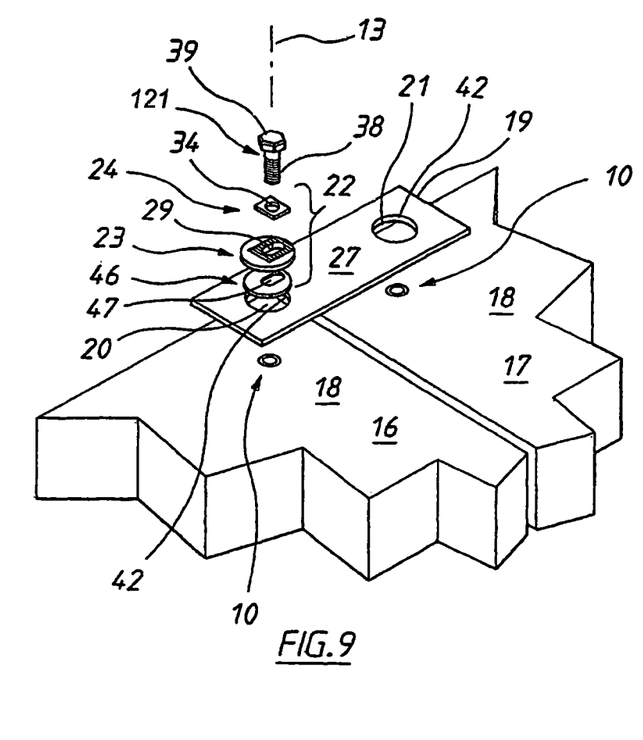
FIG. 9 is a schematic parts exploded isometric view of a modification of the threaded fastener, ferrule and washer assembly of FIG. 1.
Figure 10:
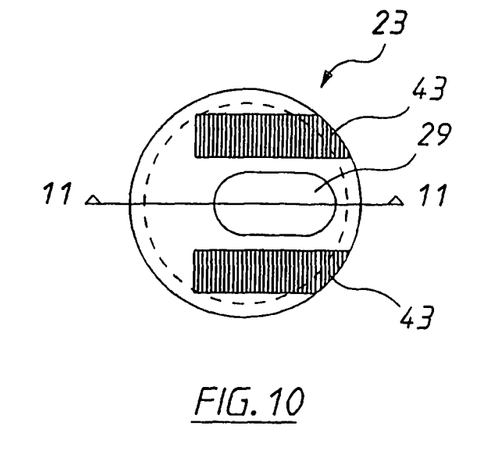
FIG. 10 is a schematic top plan view of a modification of the washer of FIG. 3.
Figure 11:
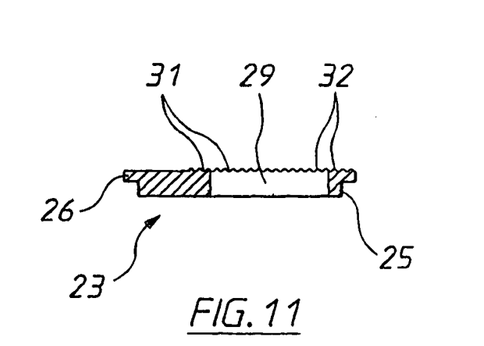
FIG. 11 is a schematic sectioned side elevation of the washer of FIG. 10 sectioned along the line 11-11.
Figure 12:
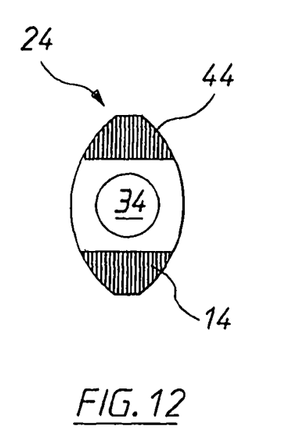
FIG. 12 is a schematic top plan view of a modification of the washer of FIG. 7.
Figure 13:
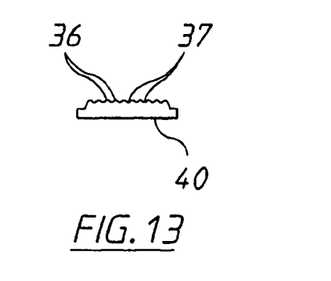
FIG. 13 is a schematic end elevation of the washer of FIG. 12.
Figure 14:
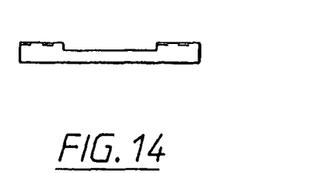
FIG. 14 is a schematic side elevation of the washer of FIG. 12.

In FIG. 9 there is schematically depicted a modification of the washer assembly 22. In this embodiment there is provided a support plate 46 that is received within the aperture 20/21. The plate 46 has a thickness less than the thickness of the plate 19 so that when the first washer portion 23 projects into the aperture 20 and the threaded fastener 21 tensioned, the plate 41 aids in supporting the first washer portion 23.

The plate 46 has an aperture 47 that is essentially the same configuration as the aperture 29.

In the previous embodiments, the surface 30 has the projections and recesses surrounds the aperture 29, with the surface 35 also having the projections and recesses surrounds the apertures 34. In the embodiment of FIGS. 10 to 14, the surface 30 still surrounds the apertures 29 however it is divided into two surface areas 43 that are located on opposite sides of the aperture 29. The surface 35 it is divided into two areas 44 located on opposite sides of the aperture 34.

Figure 15:
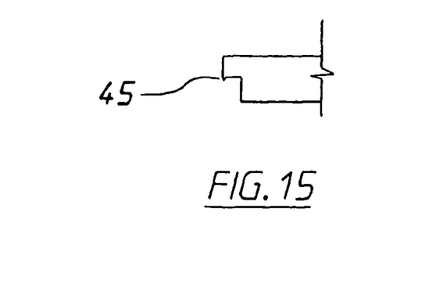
FIG. 15 is a schematic side elevation of a modification of the washer of FIG. 10.

In a further still modification, the first washer portion 23 may have sharp edge projections 45 located at spaced angular positions about the axis 13 to aid in securing the first washer portion 23 to the plate 19.

Figure 16:
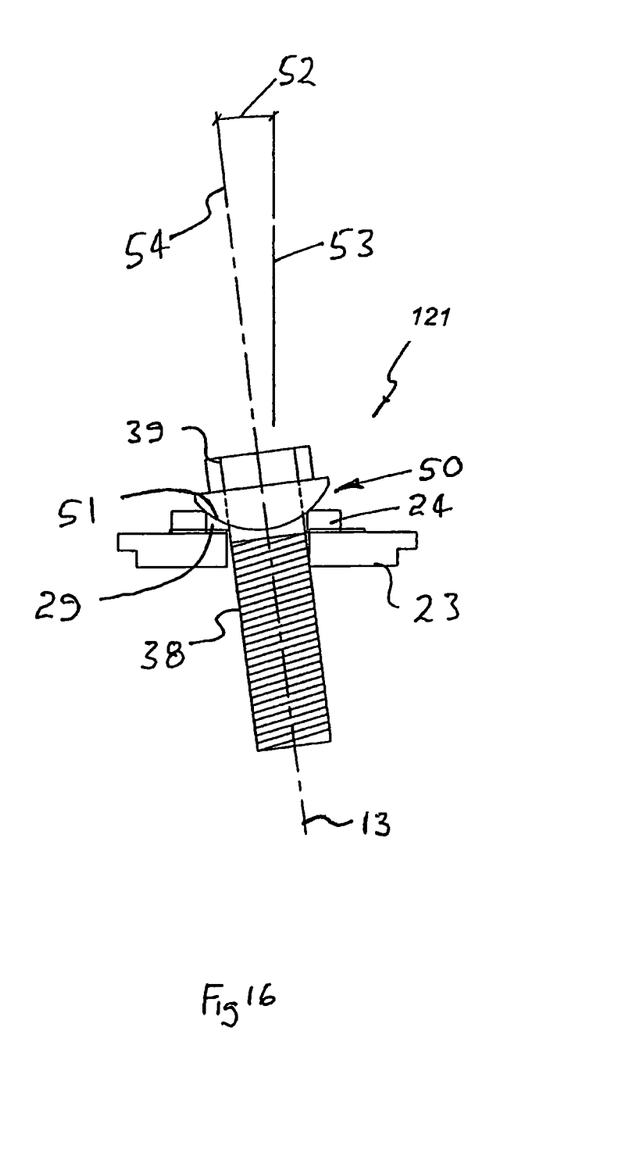
FIG. 16 is a schematic parts sectioned side elevation of the washer assembly of FIG. 1, with a modified threaded fastener.

With reference to FIG. 16, the threaded fastener 21 is modified. In this embodiment the threaded fastener 21 includes the threaded shaft 38 together with the head 39 that is engaged by a tool to cause rotation of the shaft 38. Accordingly, the head 39 is formed integral with or is attached to the shaft 38. However in this embodiment the threaded fastener 21 is integrally formed with or has mounted with it an adaptor portion 50.

It should be appreciated that the threaded fastener 21 includes the adaptor portion 50, irrespective of whether the adaptor portion 50 is formed integral with or merely engaged with the shaft 38 and head 39.

For example, the adaptor portion 50 may be integrally formed with the head 39 or may be a separate "washer" applied to the shaft 38. In such an instance the adaptor portion 50 would have a central opening through which the shaft 38 would pass. The adaptor portion 50 has an arcuate surface 51 that in this embodiment is part of a sphere. Also in this embodiment, the surface 51 is convex. Accordingly, the threaded fastener by including the adaptor portion 50 has the surface 51. The surface 51 engages the second washer portion 24 adjacent the aperture 34. Because the surface 51 is arcuate, the shaft 38 can be aligned with the longitudinal threaded passage 14 of the ferrule 10, even if the longitudinal passage 14 is displaced angularly by an angle 52 from the desired axis 53. That is, in this embodiment the surface 51 enables the shaft 38, having a longitudinal axis 54, to engage within its passage 14 even if the passage 14 has its longitudinal axis 13 not correctly oriented relative to the surface 18, that is along the axis 53.

As the aperture 29 can be moved angularly, and the washer portion 24 moved relative to the washer portion 23, the washer assembly 22 can accommodate and adjust for the displacement of the passage 14 as well as the angular inclination of the passage 14.

The ridges 31 and 36, and slots 32 and 37 provide for sliding movement of the washer portion 24 over the washer portion 23 in a direction generally transverse of the axis 13 until the shaft 38 is tensioned.

Figure 17:
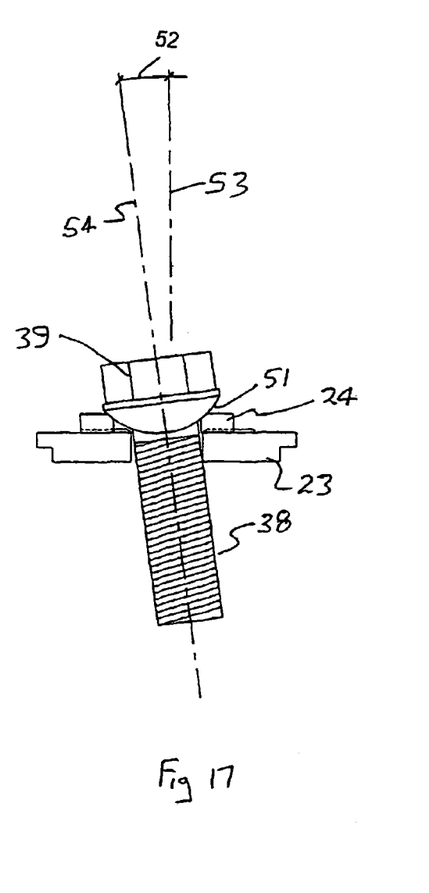
FIG. 17 is a schematic part sectioned side elevation of the washer assembly of FIGS. 1 and 16 modified.
Figure 18:
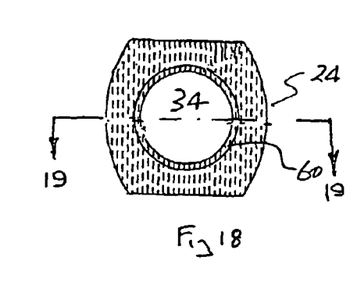
FIG. 18 is a schematic top plan view of a washer employed in the washer assembly of FIG. 17.
Figure 19:
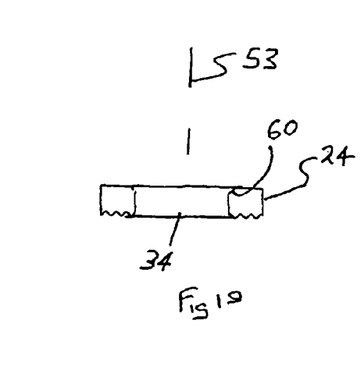
FIG. 19 is a schematic sectioned side elevation of the washer of FIG. 18 sectioned along the line 19-19.

In the embodiment of FIGS. 17 to 19, the washer portion 24 has been modified so as to include an engaging surface 60 that engages the surface 51. The surface 60 is annular so as to surround the axis 53, however the surface 16 is also concave so as to match the curvature of the convex surface 51. Accordingly, the surface 60 is a segment of a sphere. By having the surface 60 match the surface 51 the load applied to the washer portion 24 is distributed over a greater area.

In the embodiments of 16 to 19, the surface 51 is concave and the surface 60 convex. Their configurations could be reversed in that the surface 51 could be concave and the surface 60 convex.

The invention claimed is:

1. In combination a washer assembly and a threaded fastener, the threaded fastener having a longitudinal axis and to engage a concrete element, said assembly including:
 a first washer portion having a first washer portion aperture through which the threaded fastener is to pass, and a first washer portion surface at least substantially surrounding said first washer portion aperture; and
 a second washer portion, said second washer portion having a second washer portion aperture through which the fastener is to pass, the second washer portion having a second washer portion surface at least substantially surrounding the aperture of the second portion and being positioned to abut the surface of the first washer portion and to be urged into contact therewith upon tensioning of the fastener; and
 wherein the surface of said second washer portion extends beyond the aperture of said first washer portion when the surfaces abut, the aperture of said first washer portion is dimensioned to provide for relative movement between the portions with the apertures aligned to provide for the insertion of the threaded fastener therethrough, and first and second washer portion surfaces have co-operating projections and recesses that inhibit relative movement between the first and second washer portions when the threaded fastener is tensioned urging the surface of said second washer portion against the surface of said first washer portion: and
 the threaded fastener includes an arcuate surface to engage said second washer portion adjacent the aperture thereof, with the longitudinal axis of the threaded fastener being angularly displaceable relative to a desired axis.

2. The combination of claim 1 wherein the aperture of said first washer portion has a longitudinal transverse axis said first washer portion aperture being elongated in direction of said longitudinal transverse axis.

3. The combination of claim 1 wherein said projections are ridges and said recesses are slots.

4. The combination of claim 3 wherein said first washer portion surface and said second washer portion surface have ridges and slots.

5. The combination of claim 1 wherein said first washer portion includes projections to engage an article to be engaged by the threaded fastener.

6. The combination of claim 1 further including a coupling plate, with the washer assembly and threaded fasteners securing the coupling plate to said element, said coupling plate having an aperture to receive at least part of said first washer portion, and wherein said assembly further includes a support plate located in the aperture of the first washer portion, with said support plate having an aperture through which the threaded fastener is to pass.

7. The combination of claim 6 wherein the aperture of said support plate is the same configuration as the aperture of said first washer portion.

8. The combination of claim 7 wherein the aperture of said first washer portion provides a cavity in said first washer portion, and said support plate substantially occupies said cavity.

9. The combination of claim 8 wherein the projections and recesses of said first washer portion surface and said second washer portion surface surround the aperture of the first washer portion and the aperture of the second washer portion.

10. The combination of claim 9 wherein each of said first washer portion surface and said second washer portion surface has the projections and ridges located in two areas, the areas being located on opposite sides of the first washer portion aperture and the second washer portion aperture.

11. The combination of claim 1 wherein the first washer portion is generally circular in configuration.

12. In combination said first concrete element and a second concrete element, each of the first and second concrete elements having a surface, with the concrete surfaces being adjacent, a ferrule embedded in at least one of the concrete elements and having a threaded passage extending inwardly of the element from the respective surface of that element, a coupling plate to be fixed to at least said one element, the combination of claim 1 with the threaded fastener tensioned securing the coupling plate to said one element, and said threaded fastener passing through the washer assembly and engaged in the ferrule to secure the coupling plate to the respective concrete element.

13. The combination of claim 12 wherein said coupling plate has an aperture through which the threaded fastener passes, with the first washer portion urged into secure engagement with the coupling plate to secure the coupling plate to the concrete element.

14. The combination of claim 13 wherein the arcuate surface of said threaded fastener is concave.

15. The combination of claim 12 wherein the surface of the first washer portion entirely surrounds the aperture of the first washer portion, and the surface of the second washer portion entirely surrounds the aperture of the second washer portion.

16. The combination of claim 1 wherein the arcuate surface of the threaded fastener is convex.

17. The combination of claim 16 wherein the arcuate surface of said threaded fastener is part of a sphere.

18. The combination of claim 16 wherein said second washer portion includes an engaging surface surrounding the aperture of the second portion, said engaging surface being arcuate to match and engage the arcuate surface of the threaded fastener.

19. The combination of claim 1 wherein the arcuate surface of said threaded fastener extends generally transverse relative to the longitudinal axis of said threaded fastener.

20. The combination of claim 1 wherein said apertures have as their longitudinal axis said desired axis.

21. The combination of claim 1 further including an adaptor providing said arcuate surface.

22. The combination of claim 21 wherein the threaded fastener includes a head and shaft, with the adaptor integrally formed with the head or mounted on the shaft.

\* \* \* \* \*